United States Patent

Gerhardt et al.

Patent Number: 5,168,849
Date of Patent: Dec. 8, 1992

[54] INTAKE APPARATUS FOR AN INTERNAL COMBUSTION ENGINE

[75] Inventors: Jürgen Gerhardt, Korntal-Münchingen; Wolfgang Schäfer, Grossbottwar; Helmut Bassler, Weinstadt; Heinz Ehrentraut, Stuttgart; Friedrich Härterich, Gerlingen; Klaus Kaiser, Markgröningen, all of Fed. Rep. of Germany

[73] Assignee: Robert Bosch GmbH, Stuttgart, Fed. Rep. of Germany

[21] Appl. No.: 858,889

[22] Filed: Mar. 27, 1992

[30] Foreign Application Priority Data

Mar. 27, 1991 [DE] Fed. Rep. of Germany ....... 4110053

[51] Int. Cl.$^5$ .................. F02D 9/10; F02D 9/02; G01M 15/00
[52] U.S. Cl. .................... 123/396; 73/118.1; 123/494
[58] Field of Search ............. 123/337, 352, 361, 396, 123/399, 494; 73/118.1

[56] References Cited

U.S. PATENT DOCUMENTS

| | | | |
|---|---|---|---|
| 4,656,407 | 4/1987 | Burney | 123/352 X |
| 4,679,440 | 7/1987 | Okamura | 73/118.1 |
| 4,873,960 | 10/1989 | Kamifuji et al. | 123/480 |
| 4,893,502 | 1/1990 | Kubota et al. | 73/118.1 |
| 5,079,946 | 1/1992 | Motamedi et al. | 73/118.1 |

Primary Examiner—Tony M. Argenbright
Attorney, Agent, or Firm—Walter Ottesen

[57] ABSTRACT

The invention is directed to an intake apparatus for an internal combustion engine with the apparatus including an intake pipe defining a longitudinal axis and a throttle flap mounted on the intake pipe, the throttle flap including a shaft having a shaft radius (r), a throttle flap having a thickness (t) and being mounted on the shaft to be rotatable through a displacement angle, and the shaft having a diameter (2r) greater than the thickness (t); a potentiometer operatively connected to the throttle flap for detecting the displacement angle thereof; a full-load stop for fixing the displacement angle of the flap at full load; the throttle flap being adjusted to a stop angle AW of the throttle flap by impacting on the full-load stop pursuant to the relationship:

$$(2)(KETW)+(2)(AETW) \approx (2)(WSW)-DAW$$

wherein: WSW is a shaft shading angle, the angle of the throttle flap at which points on the throttle flap disposed farthest away from the shaft lie at a distance from the longitudinal axis equal to the radius (r); KETW is a permissible corresponding tolerance angle corresponding to the tolerance of the potentiometer; AETW is a permissible tolerance angle for the stop of the throttle flap; and, DAW is the difference angle by which a rearward tolerance limit for the throttle flap stop lies ahead of a rearward shaft shading limit. Because of the increased tolerance, adjusting devices can be omitted or adjusting measures such as preparatory procedures can be avoided.

6 Claims, 2 Drawing Sheets a) AW = PSW + KETW + AETW b) 2KETW + 2AETW = 2WSW
   AW = PSW + WSW − AETW c) AETW pregiven
   KETW = (2WSW − 2AETW)/2
   AW = PSW + WSW − AETW d) KETW pregiven
   AETW = (2WSW − 2KETW − DAW)/2
   AW = PSW + WSW − AETW − DAW

INTAKE APPARATUS FOR AN INTERNAL COMBUSTION ENGINE

FIELD OF THE INVENTION

The invention relates to an intake apparatus for an internal combustion engine. The intake apparatus includes a potentiometer for detecting the displacement angle of a throttle flap and a full-load stop device for fixing a stop angle of the throttle flap at full load.

BACKGROUND OF THE INVENTION

In known intake apparatus of the kind referred to above, the potentiometer and the full-load stop device must be adjusted within pregiven tight tolerances for a so-called full-load point. A full-load point is defined as a signal of pregiven value from a potentiometer which indicates that the throttle flap has reached its full-load position.

It is assumed that the full-load point is theoretically then reached when the throttle flap is displaced so far that the throttle flap lies parallel to the intake pipe axis. This angle is referred to in the following as a displacement angle of 90° or as a parallel position angle. The presence of this angle is determined in that the potentiometer connected to the throttle flap shaft supplies a signal which indicates a pregiven voltage-divider value, for example, the value 0.1. The permissible voltage-divider value range lies typically between 0.95 (throttle flap closed which corresponds to idle) and 0.05 (when the throttle flap is rotated beyond the parallel position angle until a stop is reached). The displacement range of the throttle flap of approximately 90° corresponds approximately to a voltage-divider ratio value range of 90/100. Therefore, a relatively good correspondence exists between a change of the voltage-divider ratio of 0.01 and a change of the displacement angle of the throttle flap of 1°.

In known intake apparatus, the tolerance for the voltage-divider values is given typically as approximately 0.01 for the overall value range from idle to full load, however, greater tolerances are occasionally permitted in the mid and higher load ranges. The pregiven tolerance for the potentiometer corresponds to a corresponding tolerance angle of approximately 1° which is in accordance with the foregoing.

When adjusting the intake apparatus, the procedure which is typically followed is that first the throttle flap is closed completely and the potentiometer is so far rotated with respect to the throttle flap shaft (or the potentiometer slider is so displaced) that a voltage-divider ratio of 0.94 is adjusted based on the output signal from the potentiometer. The throttle flap is then rotated to the extent that the voltage-divider ratio value of 0.01 results with this ratio value being provided for the parallel position angle. Because of the tolerance given in the foregoing, the angle in unfavorable conditions can actually be 89° or 91°. The throttle flap should come into contact engagement at the full-load stop device at a displacement angle of 91° at the earliest in order to ensure, for all cases, that the voltage-divider ratio of at least 0.01 is reached. The adjustment tolerance for this stop device is typically pregiven with approximately ≦±2°. Overall, this means that the throttle flap can be brought against the stop between 91° and 95° displacement angle.

The above tolerances were up to now the conventional tolerances and were measured so tightly that, as a rule, an adjustable resistor was necessarily used for maintaining the potentiometer tolerance and, to maintain the tolerance for the stop device, the stop device was made adjustable or must be worked on.

It is presently known to construct apparatus so that reliable characteristics are obtained notwithstanding the expansion of tolerances. This general task was also present in connection with the intake apparatus according to the invention described herein.

SUMMARY OF THE INVENTION

The invention is directed to an intake apparatus for an internal combustion engine, the intake apparatus includes an intake pipe defining a longitudinal axis; a throttle flap device mounted on the intake pipe and including a throttle flap shaft having a shaft radius (r) and a throttle flap having a thickness (t); the throttle flap being mounted on the shaft so as to be rotatable through a displacement angle; the shaft having a diameter (2r) greater than said thickness (t); a potentiometer operatively connected to the throttle flap for detecting the displacement angle thereof; a full-load stop device for fixing the displacement angle of the throttle flap at full load; the throttle flap device being adjusted to a stop angle AW of the throttle flap by impacting on the full-load stop device pursuant to the relationship:

$$(2)(KETW)+(2)(AETW) \approx (2)(WSW)-DAW$$

wherein: WSW is a shaft shading angle, namely, the angle of the throttle flap at which points on the throttle flap disposed farthest away from the shaft lie at a distance from the longitudinal axis equal to the radius (r); KETW is a permissible corresponding tolerance angle corresponding to the tolerance of the potentiometer; AETW is a permissible tolerance angle for the stop of the throttle flap; and, DAW is the difference angle by which a rearward tolerance limit for the throttle flap stop lies ahead of a rearward shaft shading limit.

The intake apparatus according to the invention is based on the realization that the setting tolerance of 6° required with respect to the foregoing is practically without purpose. This is the case because the shaft-shading angle range as defined above is typically approximately 12°. However, as long the relatively thin throttle flap is disposed in the shade of the relatively thick throttle flap shaft, an adjustment of the throttle flap does not essentially change the air flow flowing through the intake pipe. Instead, the maximum air flow always flows through, that is, the maximum quantity of air which can be drawn in by suction at full load. Full load therefore does not correspond to a single point which should be set with the greatest possible precision such as the tolerance sum of 6° pregiven up to now; instead, what is of concern here is a range having a width of typically 12°.

In known intake apparatus, and as explained above, an angular range between 89° and 95° was utilized as a tolerance range. In contrast, the intake apparatus of the invention utilizes the total shaft shading angle range of 84° to 96° referred to the above-given example. This is the case if the rearward tolerance limit for the throttle flap stop coincides with the rearward edge of the shaft-shading region. The entire shaft-shading angle region 2(WSW) is not available for the tolerance sum 2(KETW)+2(AETW) when the rearward tolerance limit has to lie in the shaft-shading region, for example, because of mechanical reasons relating to the throttle flap shaft or in order that there is no drop below a pregiven plausibility limit for the pregiven voltage-divider ratio. Instead, only the shaft-shading angle region reduced by the difference angle DAW is available with the difference angle being defined as above.

The range for the tolerance sum increased pursuant to the invention makes possible the use of potentiometers without a trimming resistor as well as stop devices which have not been prepared and which are not adjustable. This is the case because potentiometers, as used in the present case, have a tolerance of approximately ±0.02 in the voltage-divider ratio (that is, of approximately ±2° referred to the displacement angle) and since a stop device fixed to the apparatus is simple to manufacture with a tolerance of approximately ±3° to ±4° referred to the displacement angle. The sum of these tolerances results in a total tolerance range of 10° to 12° which in each cas lies within the typical shaft-shading region. If for special applications, a greater precision of the potentiometer signal is required, then the potentiometer must, as previously, have a trimmer or another adjusting device. However, then the mechanical stop can have still greater tolerances associated therewith. If, on the other hand, a narrow tolerance range is required for the mechanical stop, because for example the mechanical movement of the throttle flap lever is scanned in the full-load range, which is the case for various applications, a potentiometer can be used having a very wide tolerance range of for example ±0.03 to ±0.04. Potentiometer tolerances of this magnitude are however as a rule not permissible at idle. However, this provides a considerable advantage with reference to a simplified manufacture when the potentiometer has to have a precision of for example 0.01 in the voltage-divider ratio only in the idle range and can have larger tolerances for larger displacement angles.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
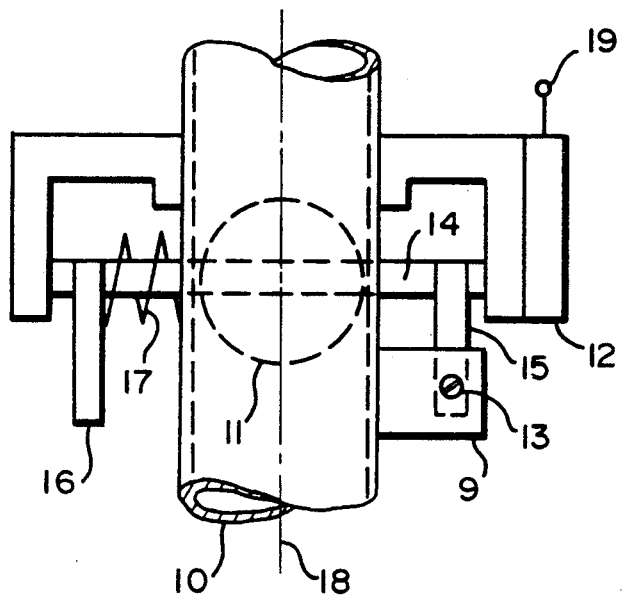
FIG. 1 is a schematic plan view of an intake apparatus according to the invention.
Figure 2:
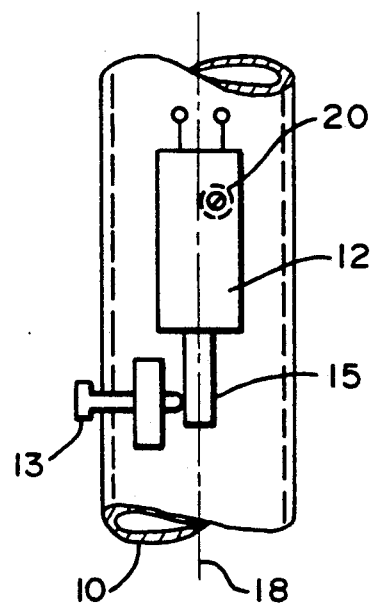
FIG. 2 is a schematic view of the intake apparatus of FIG. 1 viewed from a direction offset by 90° with respect to FIG. 1.

FIGS. 1 and 2 show an intake apparatus for an internal combustion engine with the apparatus including an intake pipe 10, a throttle flap device, a potentiometer 12 for detecting the displacement angle of the throttle flap and a full-load stop device equipped with a stop screw 13. The throttle flap device includes a throttle flap 11 and a throttle flap shaft 14 on which a stop arm 15 and a displacer arm 16 are attached. A device for displacing the throttle flap 11 acts on the displacer arm 16. The throttle flap is biased into its closing position by a helical spring 17 disposed between the displacer arm 16 and the intake pipe 10. The closing position is rotated by 90° with respect to that position which is shown in FIGS. 1 and 2.

In FIG. 2, the throttle flap 11 is precisely parallel to the intake pipe axis 18. This corresponds to a displacement angle of 90°. The stop arm 15 here impacts with a free end on the end of the stop screw 13 which is journalled in a bearing block 9 which, in turn, is fixedly attached to the intake pipe 10. The displacement angle through which the throttle flap can be maximally rotated is adjusted by rotating the stop screw 13. This angle is referred to in the following as the stop angle AW. When the stop arm 15 comes into contact engagement with the stop screw 13, the signal from the potentiometer can have at most a pregiven value which, in the example, corresponds to a voltage-divider ratio of 0.17 in a pregiven voltage divider. The signal from the potentiometer is taken off at two output terminals 19.

In known intake apparatus, the stop screw 13 is set with precision of typically ≦±2° and a trimmer 20 on the potentiometer 12 is so adjusted that, at a pregiven full-load point, a voltage-divider ratio of typically 0.1 having a tolerance of typically 0.01 results.

An intake apparatus according to the invention however neither needs the stop screw 13 nor the trimmer 20 but can have one of these adjusting devices.

Variations pursuant to which the intake apparatus according to the invention is adjusted are explained with reference to FIGS. 3 to 5.

Figure 3:
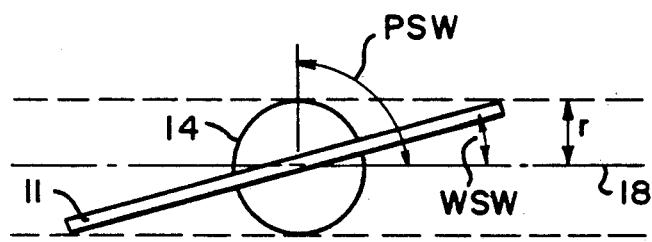
FIG. 3 is a schematic representation of a throttle flap having a throttle flap shaft for explaining the definition of the shaft-shading angle.

FIG. 3 shows the throttle flap 11 with the throttle flap shaft 14 in side elevation and is here viewed in the direction of the shaft. The intake pipe axis 18 is shown passing through the center point of the shaft 14. It is presumed that a laminar flow is present in the intake pipe 10 which runs parallel to the intake pipe axis 18. The throttle flap shaft 14 masks a component region of such an air flow with this component region being defined by the width and the diameter of the shaft. The diameter of the shaft is considerably larger than the thickness of the throttle flap 11.

When the throttle flap first lies precisely in the intake pipe axis 18 and is then slightly rotated against this axis, the above-mentioned masking effect leads to the condition that the throttle flap at first does not influence the air flow. Points on the throttle flap which lie farthest from the axis of the shaft 14 then enter the air flow, which is not masked, when these points are spaced by more than the radius (r) of the throttle flap shaft 14 from the intake pipe axis 18. This displacement angle is that angle at which the throttle flap 11 effectively influences the air flow and is referred to in the following as the shaft-shading angle WSW. This angle is shown in FIG. 3 as is a parallel position angle PSW at which the throttle flap lies parallel to the intake axis 18. The parallel position angle PSW is referred to a direction at right angles to the intake axis 18 and therefore is 90°.

Figure 4:
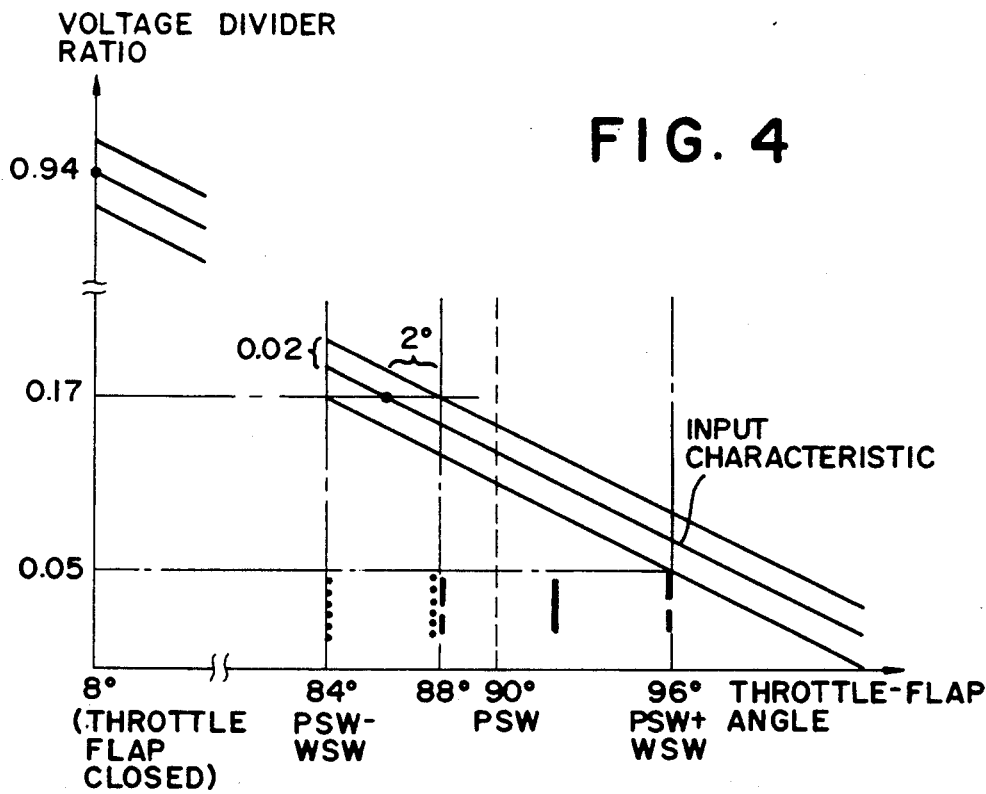
FIG. 4 shows the relationship between the displacement angle of a throttle flap and the voltage-divider ratio according to a potentiometer signal; and, FIGS. 5a to 5d show diagrams for explaining tolerance ranges.
Figure 5:
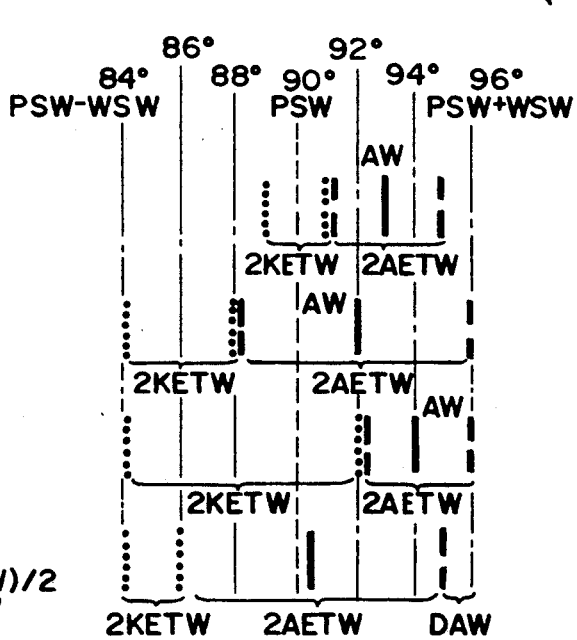

FIG. 4 shows the input characteristic of a potentiometer 12 having a tolerance band corresponding thereto. This characteristic shows how a voltage-divider ratio changes with the displacement angle of the throttle flap 11 with the voltage-divider ratio being determined by the potentiometer signal. Essentially, two points of the characteristic are pregiven as is a required linearity trace of this characteristic. In this embodiment, the one pregiven point corresponds to a value pair of a voltage-divider ratio of 0.94 and a throttle flap angle of 8° (idle corresponds to the throttle flap being closed); whereas, the second point corresponds to the value pair of a voltage-divider ratio of 0.17 at a throttle flap angle of 86°.

For a closed throttle flap, the potentiometer is so rotated relative to the throttle flap shaft 14 or the potentiometer slider is so displaced that a voltage-divider ratio of 0.94 having a tolerance of ±0.01 is adjusted. In this connection, ±0.001 is the setting tolerance at the setting (idle) point which is in contrast to the potentiometer linearity of ±0.01.

After the potentiometer is fixedly screwed in the position just described, the throttle flap is then displaced. FIG. 4 shows that for an input characteristic (according to which a voltage-divider ratio of 0.17 occurs at a throttle flap angle of 86°); this ratio can already occur at 84° but can also occur only at 88° in dependence upon at which edge of a tolerance band a particular potentiometer lies. A tolerance of ±0.02 in the voltage-divider ratio corresponds to a corresponding displacement angle tolerance of ±2°.

Because it is possible that the full load indicating voltage-divider ratio of 0.17 is only achieved when the throttle flap angle is at 88°, it must be ensured that the throttle flap does not come into contact engagement on the full-load stop device at a lower displacement angle. If the angle tolerance for this stop device is ±4° as shown in FIG. 4, the intake apparatus must be constructed for a stop angle AW of 92°. Stop angles of 88° (limit, in order to obtain at least the voltage-divider ratio 0.17) and 96° (end of the shaft-shading region) can result in the most unfavorable cases. The corresponding voltage-divider ratio for a potentiometer characteristic at the lower edge of the characteristic tolerance band shown is 0.05 for the maximum displacement angle of 96°. This is the case because, at 84° for the above-mentioned characteristic, the value 0.17 is reached since the total shaft-shading region is 12° in the example and because, in the case of the example, an angle change of 1° corresponds to a change of 0.01 in the voltage-divider ratio. If there is a drop below the voltage-divider ratio 0.05, this is not plausible for the proper operation. The value of 0.05 therefore defines a plausibility threshold value which causes, when there is a drop therebelow, an error in the intake apparatus to be assumed.

FIGS. 5a to 5d show variations for the stop angle AW and tolerance ranges. The stop angle is always marked by a solid line and the tolerance limits for this angle are shown as broken lines. The potentiometer tolerance limits are shown as dotted.

FIG. 5a shows the selection of the stop angle for the state of the art. As mentioned above, the potentiometer tolerance range lies symmetrically about 90°. The mechanical tolerance range continues therefrom for the full-load stop device.

FIG. 5b shows the case of FIG. 4. In this embodiment, the assumption is made that the shaft-shading range 2(WSW) is just covered completely by the sum of the tolerance bands for the potentiometer and for the stop, that is, 2(KETW)+2(AETW). The tolerance angle KETW corresponding to the potentiometer tolerance is 2° and the tolerance angle AETW corresponding to the mechanical stop tolerance is 4°. These tolerance angles are realizable without difficulty and without special adjusting devices such as the trimmer 20 or the adjustment screw 13 being necessary.

FIG. 5c covers the embodiment wherein a small tolerance angle for the full-load stop device is pregiven. This applies, for example, in the case of coaction with the drive control, when the displacement path of a lever, for example the stop arm 15 or the displacer arm 16, is scanned and the displacement tolerance of this lever must not be too great. In this case, an adjusting device for obtaining the low tolerance of the angle AETW of for example only 2° is required. However, then, as shown, the entire remaining shaft-shading region is available for the tolerance band of the potentiometer. In this way, the potentiometer can have at least in the full-load range very coarse tolerances.

FIG. 5d is directed to the embodiment wherein the corresponding tolerance angle KETW for the potentiometer tolerance is dimensioned very tight, in the example to 1° and wherein the rearward tolerance limit for the stop is pregiven at 95°, that is, by a difference angle DAW of 1° ahead of the rearward edge of the shaft-shading region. Then the trimmer 20 or another adjusting device on the potentiometer is required and only the shaft-shading region reduced by the difference angle is available for the tolerance band of the stop device. Corresponding limitations in the cases shown in FIGS. 5b and 5c are possible. Advancing the rearward tolerance limit for the throttle flap stop in the shaft-shading region can be for different reasons: to ensure that no drop below a lowest voltage-divider ratio takes place; to limit mechanically the stroke of the throttle flap adjusting device; or, to limit disturbing turbulences which reduce the shaft-shading region with respect to its expansion derived purely geometrically.

With respect to the foregoing, it is noted that the throttle flap must not necessarily influence the air mass flow when the throttle flap moves out of the shaft-shading region. At low engine speeds, operating conditions exist at which the air flow is influenced (starting at a displacement angle of the throttle flap of approximately 30° to 40°) alone by the suction volume flow of the engine and no longer by the position of the throttle flap. Such operating conditions are however not of interest for the setting of the full-load point discussed here.

The values given in the foregoing for the input characteristic as well as for the angle and tolerance ranges are directed to typical cases. The relationship found above however is general. The persons of skill in this art need only compute the effective shaft-shading region of the throttle flap and subtract from this the difference angle following from the shaft-shading angle and the specification of the intake apparatus. The angle range obtained in this manner defines the maximum value for the sum of the two permissible tolerance ranges. In this way, it is ensured that the full-load signal is always given within the shaft-shading region notwithstanding obtained wide tolerance ranges.

It is understood that the foregoing description is that of the preferred embodiments of the invention and that various changes and modifications may be made thereto without departing from the spirit and scope of the invention as defined in the appended claims.

What is claimed is:

1. An intake apparatus for an internal combustion engine, the apparatus comprising:
   an intake pipe defining a longitudinal axis;
   a throttle flap device mounted on said intake pipe and including: a throttle flap shaft having a shaft radius (r); a throttle flap having a thickness (t) and being mounted on said shaft so as to be rotatable through a displacement angle; and said shaft having a diameter (2r) greater than said thickness (t);

a potentiometer operatively connected to said throttle flap for detecting the displacement angle thereof;

a full-load stop device for fixing the displacement angle of said flap at full load;

said throttle flap device being adjusted to a stop angle AW of said throttle flap by impacting on said full-load stop device pursuant to the relationship:

$$(2)(KETW)+(2)(AETW) \cong (2)(WSW)-DAW$$

wherein:

WSW is a shaft shading angle, namely, the angle of said throttle flap at which points on the throttle flap disposed farthest away from said shaft lie at a distance from said longitudinal axis equal to said radius (r);

KETW is a permissible corresponding tolerance angle corresponding to the tolerance of said potentiometer;

AETW is a permissible tolerance angle for said stop of said throttle flap; and,

DAW is the difference angle by which a rearward tolerance limit for the throttle flap stop lies ahead of a rearward shaft shading limit.

2. The intake apparatus of claim 1, wherein neither the full-load stop device nor the potentiometer have an adjusting device.

3. The intake apparatus of claim 1, wherein said full-load stop device has an adjusting device.

4. The intake apparatus of claim 1, wherein said potentiometer has an adjusting device for adjusting said potentiometer.

5. The intake apparatus of claim 1, wherein said difference angle is equal to zero.

6. The intake apparatus of claim 1, wherein PSW is a parallel position angle and the value supplied by said potentiometer at a displacement angle PSW+WSW is greater than a plausiblity threshold value.

* * * * *